United States Patent
Conley et al.

(10) Patent No.: US 6,478,052 B1
(45) Date of Patent: Nov. 12, 2002

(54) PULSATION DAMPING ASSEMBLY AND METHOD

(76) Inventors: Jeff Alan Conley, 1311 Nantucket, Sugar Land, TX (US) 77478; Michael Don McNeely, 3217 Canadian, Katy, Harris County, TX (US) 77493

( * ) Notice: Subject to any disclaimer, the term of this patent is extended or adjusted under 35 U.S.C. 154(b) by 0 days.

(21) Appl. No.: 09/915,006

(22) Filed: Jul. 25, 2001

(51) Int. Cl.$^7$ .............................................. F16L 55/04
(52) U.S. Cl. ........................ 138/30; 138/26; 220/720
(58) Field of Search ............................ 138/30, 26, 40; 220/720, 721, 723

(56) References Cited

U.S. PATENT DOCUMENTS

| | | | |
|---|---|---|---|
| 874,517 A | 12/1907 | Lowry ........................ 138/404 |
| 2,345,475 A | 3/1944 | Herman et al. ............... 138/30 |
| 2,495,693 A | 1/1950 | Byrd, Jr. et al. ............. 138/30 |
| 2,563,257 A | 8/1951 | Loukonen ..................... 138/30 |
| 2,583,231 A | 1/1952 | Ragland ....................... 138/30 |
| 2,609,001 A | 9/1952 | Hebard ........................ 138/30 |
| 2,760,518 A | 8/1956 | Peet ........................... 138/30 |
| 2,841,181 A | 7/1958 | Hewitt et al. ................. 138/30 |
| 2,845,951 A | 8/1958 | Hugley et al. ................. 138/30 |
| 2,875,786 A | 3/1959 | Shelly .......................... 138/30 |
| 2,875,788 A | 3/1959 | Pier ............................. 138/30 |
| 2,878,835 A | 3/1959 | Peterson ...................... 138/30 |
| 2,949,932 A | 8/1960 | Hewitt ........................ 138/304 |
| 3,063,470 A | 11/1962 | Forster ....................... 138/30 |
| 3,169,551 A | 2/1965 | Lewis .......................... 138/26 |
| 3,251,380 A | 5/1966 | Mercier ....................... 138/30 |
| 3,276,477 A | 10/1966 | Bleasdale .................... 138/30 |
| 3,276,478 A | 10/1966 | Bleasdale .................... 138/30 |
| 3,331,399 A | 7/1967 | Von Forell ................... 138/30 |
| 3,380,480 A | 4/1968 | Bleasdale .................... 138/30 |
| 3,625,242 A | 12/1971 | Ostwald ...................... 138/30 |
| 3,628,573 A | 12/1971 | Loliger et al. ................ 138/30 |
| 3,744,527 A | 7/1973 | Mercier ....................... 138/30 |
| 3,868,972 A | 3/1975 | Zirps ........................... 138/30 |
| 3,893,485 A | 7/1975 | Loukonen ..................... 138/30 |
| 4,186,775 A | * | 2/1980 | Muroi ......................... 138/26 |
| 4,432,393 A | * | 2/1984 | Mills ........................... 138/30 |
| 4,526,205 A | 7/1985 | Sugimura et al. ............. 138/30 |
| 4,587,993 A | * | 5/1986 | Hartl ........................... 138/30 |
| 4,628,964 A | 12/1986 | Sugimura et al. ............. 138/30 |
| 4,732,175 A | * | 3/1988 | Pareja ......................... 138/26 |
| 4,732,176 A | * | 3/1988 | Sugimura ..................... 138/30 |
| 4,759,387 A | * | 7/1988 | Arendt ........................ 138/30 |
| 4,768,616 A | * | 9/1988 | Richard et al. ............... 138/30 |
| 5,172,729 A | 12/1992 | Vantellini .................... 138/26 |
| 5,205,326 A | 4/1993 | Paley et al. .................. 138/30 |
| 5,210,382 A | 5/1993 | Paley et al. .............. 138/30 X |
| 5,353,840 A | 10/1994 | Paley et al. ................. 138/31 |
| 5,732,741 A | 3/1998 | Shiery ......................... 138/30 |
| 5,735,313 A | 4/1998 | Jenski, Jr. et al. ........... 138/30 |
| 6,131,613 A | * | 10/2000 | Jenski et al. ................. 138/26 |

* cited by examiner

*Primary Examiner*—Patrick Brinson
(74) *Attorney, Agent, or Firm*—Browning Bushman PC (57) ABSTRACT

A flexible diaphragm is disposed in a housing between a working fluid and a gas-charged chamber to damp pulsations in the working fluid. The diaphragm has a flat base that, when fully distended by pressure in the gas chamber, lies against a flat, perforated circular metal sheet. The perforated metal sheet is closely spaced from a planar backing surface that prevents the sheet from permanently deforming under the force exerted by the pressurized diaphragm. An annular channel formed in the backing surface places the working fluid in contact with the perforated metal sheet. Pressure in the working fluid displaces the diaphragm away from the perforated metal sheet. A flat retaining wall in the gas chamber limits the travel of the diaphragm away from the metal sheet. Pressure pulsations in the working fluid move the diaphragm back and forth between the retaining walls. Back and forth flow of the pulsing fluid through the perforations and the compression of the gas in the gas chamber dissipates the energy of the pulses to achieve the damping effect. Multiple pulsation dampers operating at different charge pressures may be used to increase the range of high damping ratios for wider working fluid pressure ranges.

25 Claims, 6 Drawing Sheets

PULSATION DAMPING ASSEMBLY AND METHOD

BACKGROUND OF THE INVENTION

1. Field of the Invention

The present invention relates to the damping of pressure pulsations in a fluid system. More particularly, the present invention relates to a gas charged pulsation damping assembly for damping pressure pulsations in power, transmission or control systems.

2. Setting of the Invention

Working fluid used in power, transmission and control systems may be subjected to periodic, rapid pressure increases and decreases. As used herein, the term "working fluid" is intended to refer to liquids and gases, both flowing and static, used to monitor, power or regulate machinery or to the fluids moving through a pipeline, or to other fluids that are the effective or active fluids in a static or dynamic system.

These pressure fluctuations in working fluids, referred to generally as "pulsations," can damage and interfere with the operation of the systems. Pressure pulsations are frequently induced by positive displacement pumps associated with systems. A wide variety of devices have been developed to dampen the pulsations. A common pulsation damping technique allows the working fluid pressure to be exerted against an energy-absorbing device that tends to diminish the amplitude of the pulsations.

A common "tubular" design used for pulsation damping of flowing fluids employs a perforated tube section extending centrally through an annular, gas-pressurized diaphragm contained within a section of a system fluid flow line. One such design is illustrated in U.S. Pat. No. 4,759,387. Pulsations in the working fluid (usually a liquid) flowing through the perforated tube are damped by distending the diaphragm radially outwardly. This action forces the working fluid within the tube to flow radially through the perforations in the tube, thereby dissipating a portion of the pulsation energy with no system loss of flow or drop in pressure of the working fluid.

Pulsation damping systems using the described prior art design are usually intended to operate within a relatively narrow pressure range within which the diaphragm is substantially unstressed. If the system is operated outside its optimum pressure range, the pressurizing gas and the pressure surges caused by pulsations in the working fluid can stretch and thereby stress the resilient diaphragm. By virtue of their design, these prior art pulsation damping systems are relatively large and the performance and efficiency of such systems vary as a function of the gas pressure charges acting against the diaphragm. One prior art pulsation damping arrangement of the described "tubular" design exhibits a significant decrease in damping ratio as the gas charge (determined as a percentage of working fluid pressure) is increased toward the operating pressure of the working fluid.

These "tubular" pulsation damping systems require the fabrication of a perforated tubular section that underlies and supports the inflatable diaphragm. Some of such systems require additional structural supporting materials to prevent the perforated tube from collapsing under the compressive force exerted by the pressurized diaphragm. These perforated tubes and associated structural supporting members can be large and expensive to fabricate, particularly when it is necessary to use exotic metals and alloys and other corrosion resistant or specialty strength-enhancing materials.

Another prior art pulsation damping design uses a bellows or a piston-cylinder arrangement disposed in a surge chamber that communicates with the working fluid being damped. U.S. Pat. No. 5,205,326 illustrates pulsation dampers of this type. The bellows compresses, or the piston is driven into the cylinder, as the pressure of the working fluid in the surge chamber increases during pulsation. Compressed gas or mechanical springs are used to resist the compressive force exerted by the fluid pulsation. As with the tubular pulsation damping systems, the damping efficiency of the bellows and piston-cylinder arrangements varies over the range of the internal gas charge or spring force exerted against the pressure responsive element. The bellows and piston-cylinder members of these prior art systems require relatively large components and are also expensive to fabricate.

The prior art also teaches a pulsation damper design employing a relatively thick, flexible diaphragm that rests against a domed, perforated support when the gas pressure charging the diaphragm is sufficiently greater than that of the pressure of the working fluid. The design protects the diaphragm from rupturing when a large pressure differential exists between the pressure of the working fluid and the gas charge pressure. An example of such a design may be seen in U.S. Pat. No. 2,563,257, which employs a perforated plate having a cup or dish shape to support the gas charged diaphragm. The diaphragm is movable in a large chamber between its extreme pressured and unpressured positions without stretching or stressing the diaphragm. Because the diaphragm can move its entire length in either direction from its central mounting point, the pulsation absorber described in the patent requires a chamber that is substantially twice the unstressed axial displacement height of the diaphragm. The cup or dish shape is said in the patent to be preferable to a flat perforated plate in that it acts as an arch and provides a greater area for perforations.

As with the previously described pulsation damping systems employing tubular diaphragms and bellows or piston-cylinder arrangements, the dome-shaped cup or dish design can be relatively large and expensive to fabricate, particularly when it must be constructed of metal alloys or other specialty, strength-enhancing materials. The damping efficiency of the systems can also be widely variable over the range of the pressure variations in the working fluid.

SUMMARY OF THE INVENTION

A flexible diaphragm is disposed between a working fluid and a gas-charged chamber to form a pulsation damper. The diaphragm has a flat base that, when fully distended by pressure in the gas chamber, lies against a flat, perforated circular metal sheet. The perforated metal sheet is closely spaced from a planar backing surface that prevents the sheet from permanently deforming under the force exerted by the pressurized diaphragm. An annular channel formed in the backing surface places the working fluid in contact with the perforated metal sheet and permits fluid flow through the assembly when the perforated sheet is engaging the planar backing surface. Pressure pulsations in the working fluid displace the diaphragm away from the perforated metal sheet. A flat retaining wall in the gas chamber limits the travel of the diaphragm away from the metal sheet. Back and forth flow of the pulsing working fluid through the perforations and the compression of the gas in the gas chamber dissipate the energy of the pulses to achieve the damping effect.

The diaphragm is maintained in a non-stressed condition during its movement between the flat metal sheet and the flat retaining wall. The diaphragm moves only in a single direction from its mounting within the body of the damper assembly, which reduces wear of the diaphragm and contributes to reducing the total height of the damping assembly. The lateral walls of the cup-shaped diaphragm are relatively thin compared to the diaphragm base. The thin wall construction enhances the response of the diaphragm to pressure fluctuations in the working fluid while the thicker base protects the diaphragm from damage caused by engagement with, and movement over, the perforated disk.

The design of the components of the present invention coupled with the limited movement, non-stressed operating range of the diaphragm produce a low cost, long-lived assembly that exhibits a linear relationship between its damping ratio verses the gas chamber charge as a percentage of the working fluid pressure, even at percentages approaching 100 percent of the working fluid pressure.

The components of a pulsation damper of the present invention may be easily and inexpensively fabricated from readily available materials. The use of planar surfaces for the perforated metal sheet, the backing surface behind the sheet and the retaining wall in the gas chamber reduces fabrication costs of both the retaining members and the conforming diaphragm. The flat backing surface behind the perforated metal sheet is easily machined or milled to provide a desired fluid course that is maintained in close contact with the sheet. The limited displacement and absence of stress in the diaphragm, over the full operating range of the system, combined with the system design, enables long-lived, efficient operation even at gas pressure charges approaching the design operating pressure of the working fluid.

The design of the pressure damper of the present invention also permits fabrication of a relatively small assembly that can be easily associated with control elements in pressure regulating systems.

The improved operating efficiency and small size of the pressure damping assembly of the present invention enhances its suitability for use in pressure sensitive control systems and other pressure sensitive devices, such as pilot operated pressure relief valves. Pilot operated pressure relief valves are set to open and closed automatically as required to maintain operating pressure levels by relieving excess system pressure. The "set pressure" of the relief valve is typically set at some percentage below the maximum allowable working pressure of the piping and equipment associated with the relief valve.

In many commercial systems, such as may be found for example at a chemical plant, it is desirable to operate a "process" at as high a pressure as possible, within safe operating levels of the piping and associated equipment. Operating at higher pressures permits higher efficiencies and better yields from the process. A pilot operated pressure relief valve protects the piping and attached equipment by relieving excess pressure in the system once the "set point" of the pilot has been exceeded. Without damping, the peaks of the pressure pulsations in the working fluid are typically high enough to activate the pilot and pressure relief valve and/or cause excessive wear in the pilot. To keep from activating the relief valve and reducing the life of the pilot, the plants must reduce the pressure of the process, thus reducing efficiency and yield. Adding a pulsation damper of the present invention allows the process working pressure to be raised closer to the set pressure of the relief valve. The pulsation damper of the present invention achieves a high degree of damping efficiency at gas charge pressures approaching 100 percent of the process working pressure.

In the method of the present invention, multiple pulsation dampers are simultaneously exposed to the working fluid. The pulsation dampers are provided with different gas charges to more effectively dampen pulsations in wider pressure ranges of the working fluid.

In view of the foregoing, it will be appreciated that an important object of the present invention is to provide an efficient pulsation damper having relatively small dimensions, which is inexpensively fabricated from readily available materials.

An important object of the present invention is to provide a small-bodied pulsation damper for damping pressure pulses in a working fluid wherein the pulsation damper exhibits an increasing damping ratio as the gas charge pressure in the damper approaches the pressure of the fluid being damped.

An object of the present invention is to provide an assembly to dampen the pulsations in a monitored fluid in which the damping ratio of the assembly increases linearly as the gas charge in the damper approaches the pressure of the monitored fluid.

A related object of the present invention is to provide an apparatus for damping pressure pulsations in a monitored fluid wherein the damping ratio of the apparatus increases linearly over a range of gas charges that extends beyond a gas charge of 90 percent of the monitored fluid pressure.

Yet another object of the present invention is to provide a small, inexpensively fabricated, damping apparatus that may be used in a pressure sensitive system whereby operation of the pressure sensitive system is optimized.

A specific object of the present invention is to provide a small, inexpensively fabricated, efficient damping apparatus that may be used with a pilot operated pressure relief valve to permit improved efficiency and yield of the process system being protected by the pressure relief valve.

The foregoing objects, features and advantages of the present invention, as well as others, will be better understood and more fully appreciated by reference to the following drawings, specification, and claims.

DESCRIPTION OF THE PREFERRED EMBODIMENTS

Figure 1:
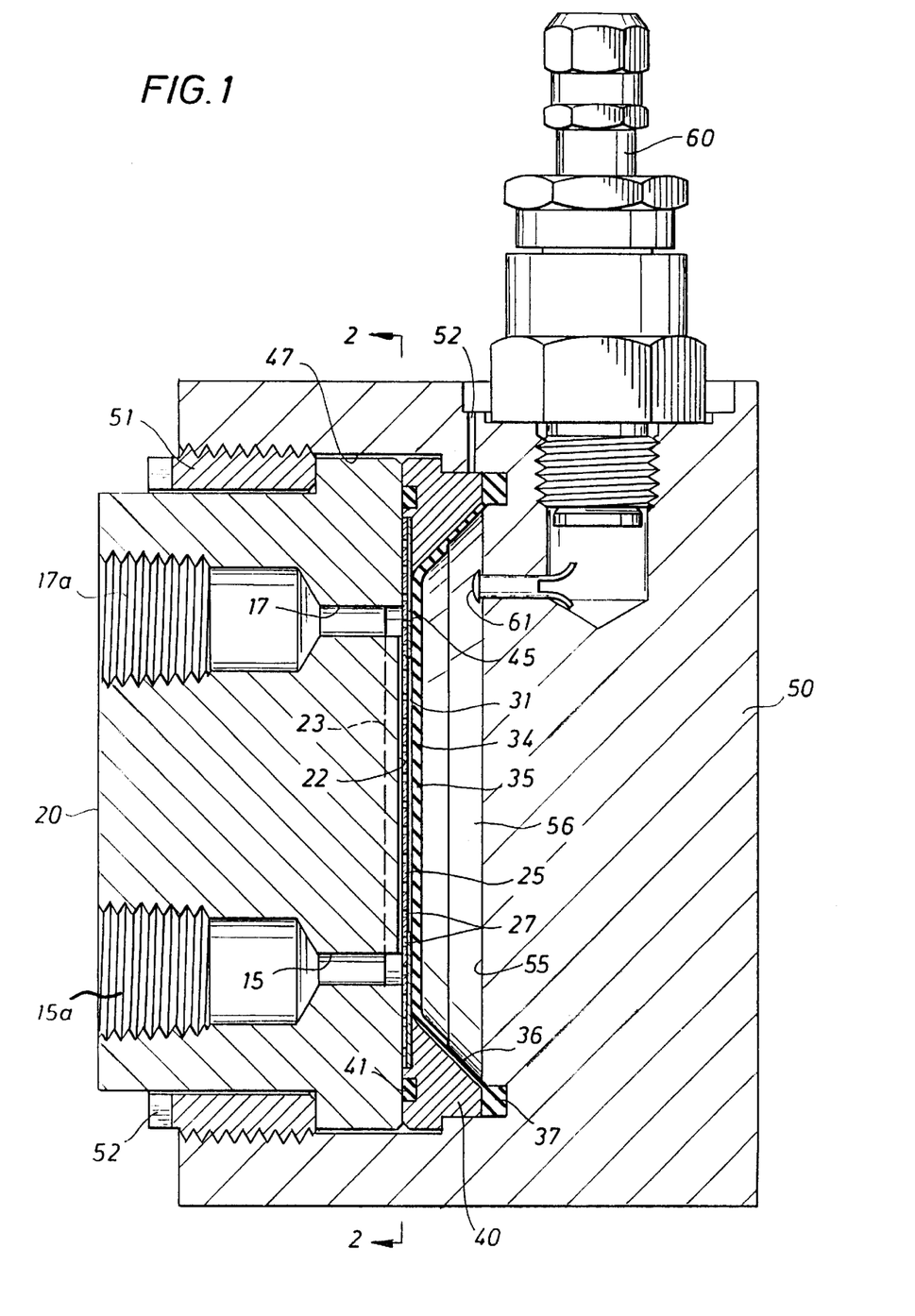
FIG. 1 is a vertical sectional view of a pulsation damper of the present invention.

A pulsation dampening assembly of the present invention is indicated generally at 10 in FIG. 1. The working fluid to be damped enters the assembly through an inlet port 15 and exits through an outlet port 17. The ports are formed in a cylindrical steel coupling 20 and are equipped with internally threaded receptacles 15a and 17a, respectively, for connection with threaded fittings connecting to a pressure system.

Figure 2:
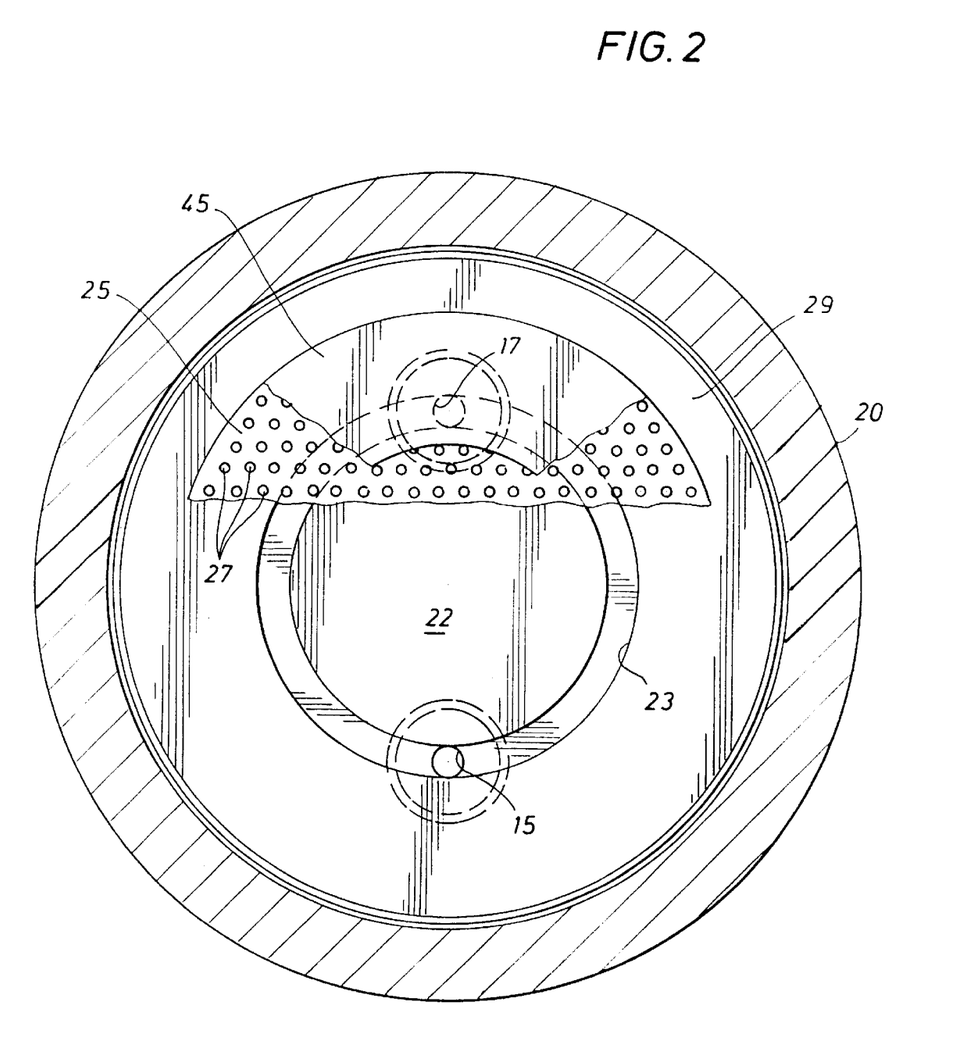
FIG. 2 is a sectional view taken along the line 2—2 of FIG. 1.
Figure 3:
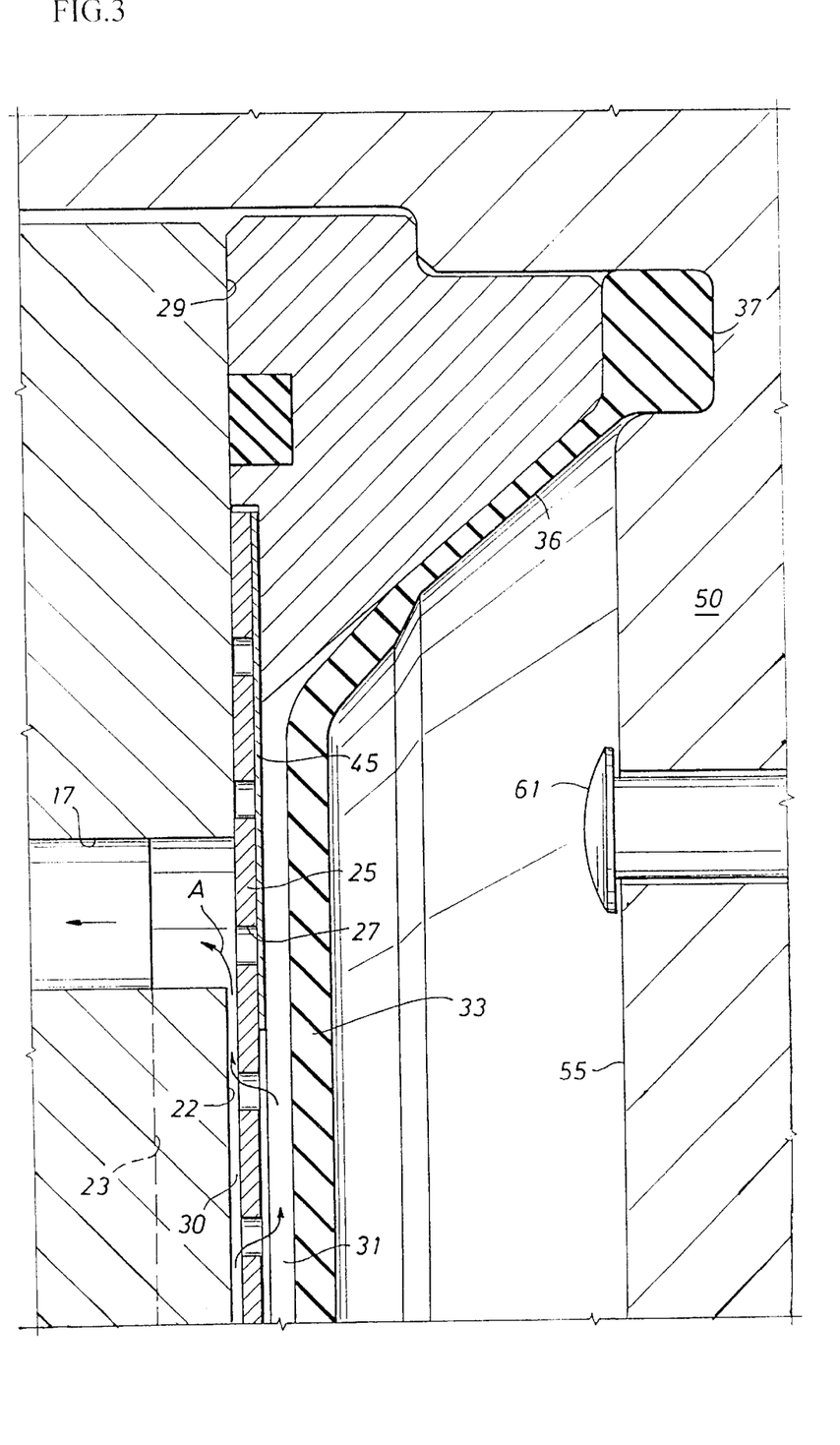
FIG. 3 is an enlarged cross sectional view of a small area of FIG. 1 illustrating details in the construction of the damping of the present invention.

As best illustrated by joint reference to FIGS. 1, 2 and 3, the coupling 20 is an axially extending cylindrical body having a flat recessed axial end surface 22. An annular groove 23 formed in the planar end surface 22 connects with the ports 15 and 17 to permit fluid communication between the inlet port 15 and the outlet port 17.

A circular metal disk 25 having multiple perforations 27 is mounted on an annular ridge 29 formed around the flat recessed space 22 of the steel coupling 20. The mounting of the disk 25 on the ridge 29 produces an axially and radially extending space 30 between the disk 25 and the recessed surface 22 through which the working fluid flows during operation of the pulsation damper. As will be further explained, fluid in the space 30 is forced to flow back and forth through the perforations 27 between the space 30 and a second axially and radially extending space 31 formed on the opposite side of the disk 25.

A flexible flat-bottomed diaphragm 33 is positioned with its flat bottom 34 engageable with the metal disk 25. The diaphragm 33 has a reduced thickness, annular wall section 36 that extends between the relatively thick flat bottom 34 and an enlarged annular mounting lip 37 at the mouth of the diaphragm. The reduced thickness, annular wall section 36 is supported against an annular steel ring 40 positioned on the rim 29 of the coupling 20. An annular, elastomeric O-ring seal 41 positioned between the ring 40 and the ridge 29 maintains a pressure seal between the two components.

A thin flat ring 45 of Teflon® (polytetrafluoroethylene "PTFE") is clamped between the steel ring 40 and the metal disk 25 to provide a smooth, low friction surface for the diaphragm 33 to move along as the diaphragm pushes the perforated disk 25 into the annular groove 23 in the coupling 20, keeping the diaphragm from extruding into the perforations or being cut on the edges of the perforations.

The coupling 20 is received within an internally threaded cylindrical opening 47 in a steel main body 50. An externally threaded, steel retaining ring 51 is positioned in the cylindrical opening 47 to retain the coupling 20 in firm engagement with the main body 50. Wrench recesses 52 are provided at an end of the ring 51 for engagement with a torque wrench (not illustrated) that may be used to rotate the ring 51 to make up the threads between the ring and the body 50 to firmly seat the coupling 20 in the recess 47 of the body 50. A radial opening 53 extends through the sidewall of the body 50 into the recess 47 and acts a "weep hole" for easy, visible indication of a diaphragm or O-ring failure.

The cylindrical body 50 is provided with a flat retaining wall 55 that extends laterally from the central axis of the body 50. The wall 55 cooperates with the flexible diaphragm 33 to form a retention surface to enclose a gas pressure chamber 56. A gas pressure charge is supplied to the gas chamber 56 via a gas chamber charging valve 60. Dry nitrogen, or other suitable gas, may be used to charge the chamber 56. The valve 60 operates conventionally to permit the one-way application of a high-pressure charging gas into the confined area of the pressure chamber 56. A round top poppet 61 covers the entry port extending through the retaining wall 55 into the chamber 56 to prevent displacement of the diaphragm 34 into the port when the pressure of the monitored fluid collapses the diaphragm against the retaining wall 55. Bent legs 61a of the poppet 61 hold the poppet in place while permitting sufficient movement of the poppet head to allow the gas charge to flow from the valve 60 into the chamber 56.

The detail drawing of FIG. 3 illustrates the axially and radially extending space 30 formed between the flat bottom 22 and the perforated disk 25. During operation of the pulsation damper, fluid flows from the inlet 15 to the outlet 17 of the assembly along a course indicated by the arrow A. In following the course between the inlet and outlet, the fluid is forced to flow through the perforations 27 in the disk 25 between the axial spaces 30 and 31. The back and forth flow of the fluid through the perforations 27 and the compression of the diaphragm 33 damps the pressure pulsations in the fluid.

In the operation of the damping apparatus of the present invention, the various backing and support surfaces afforded on either side of the diaphragm 33 are effective in protecting the diaphragm from damage regardless of the direction or the size of the pressure differential acting across the diaphragm. When the damping assembly 10 is initially provided with a gas charge through the charging valve 60, the absence of pressure in the spaces 30 and 31 allows the diaphragm 33 to be expanded fully against the annular ring 40, Teflon® ring 45 and the perforated disk 25. The annular disk 25 may be pushed against the backing surface 22 when the pressure in the chamber 56 is sufficiently high. Full distension of the diaphragm may also occur during operation at any time the pressure in the chamber 56 is sufficiently greater than that of the fluid being damped.

The design of the assembly 10 prevents damage to the perforated disk during these periods of relatively high pressures in the gas chamber 56. To this end, the small spacing between the backing surface 22 and the disk 25 limits the axial travel of the perforated disk below the yielding stress of the disk material and prevents the disk from being permanently deformed when it is pushed against the backing surface. The annular ring 45 provides additional backing support above the annular groove 23 to prevent the material of the diaphragm 33 from being cut or extruded through the perforations 27.

When the pressure of the working fluid sufficiently exceeds the pressure in the gas chamber 56, which may occur during abnormal working pressures or because of a loss of pressure in the chamber 56, the diaphragm 33 is forced against the retaining wall 55. The retaining wall 55 limits the axial movement and distension of the diaphragm 33 to protect it from damage. During such periods of high working fluid pressures acting on the diaphragm, the round-headed poppet 61 prevents the material of the diaphragm from extruding into the charging port.

Under normal operating conditions, the gas chamber 56 is charged to a pressure that is determined by the operating pressure of the working fluid to be damped. An initial gas chamber charge may be 60 to 90 percent, or more, of the expected operating pressure of the fluid to be damped. During normal operation, when exposed to the system fluids, the diaphragm 33 is displaced away from the perforated disk 25 into the area between the backing surface 22 and the retaining wall 55 such that the average gas charge pressure and the average pressure of the fluid being damped are substantially equal.

Pressure pulsations of the working fluid cause the diaphragm to move back and forth in the area between the retaining wall 55 and the perforated disk 25, alternately compressing and decompressing the gas charge in the chamber 56. This action forces the working fluid to flow back and forth through the perforations 27 in the disk 25, dissipating the energy of the pulsations. The working fluid is exposed to a large area of perforations by the combined action of the annular groove 23 and the large surface area formed in the space 30 between the perforated disk and the backing surface 22. The system design permits fluid damping with the diaphragm 33 having to move only the length of the axial height of its annular wall section 36. The diaphragm 33 may not travel axially beyond its point of mounting with the main body, thus preventing reverse flexing of the diaphragm.

Figure 6:
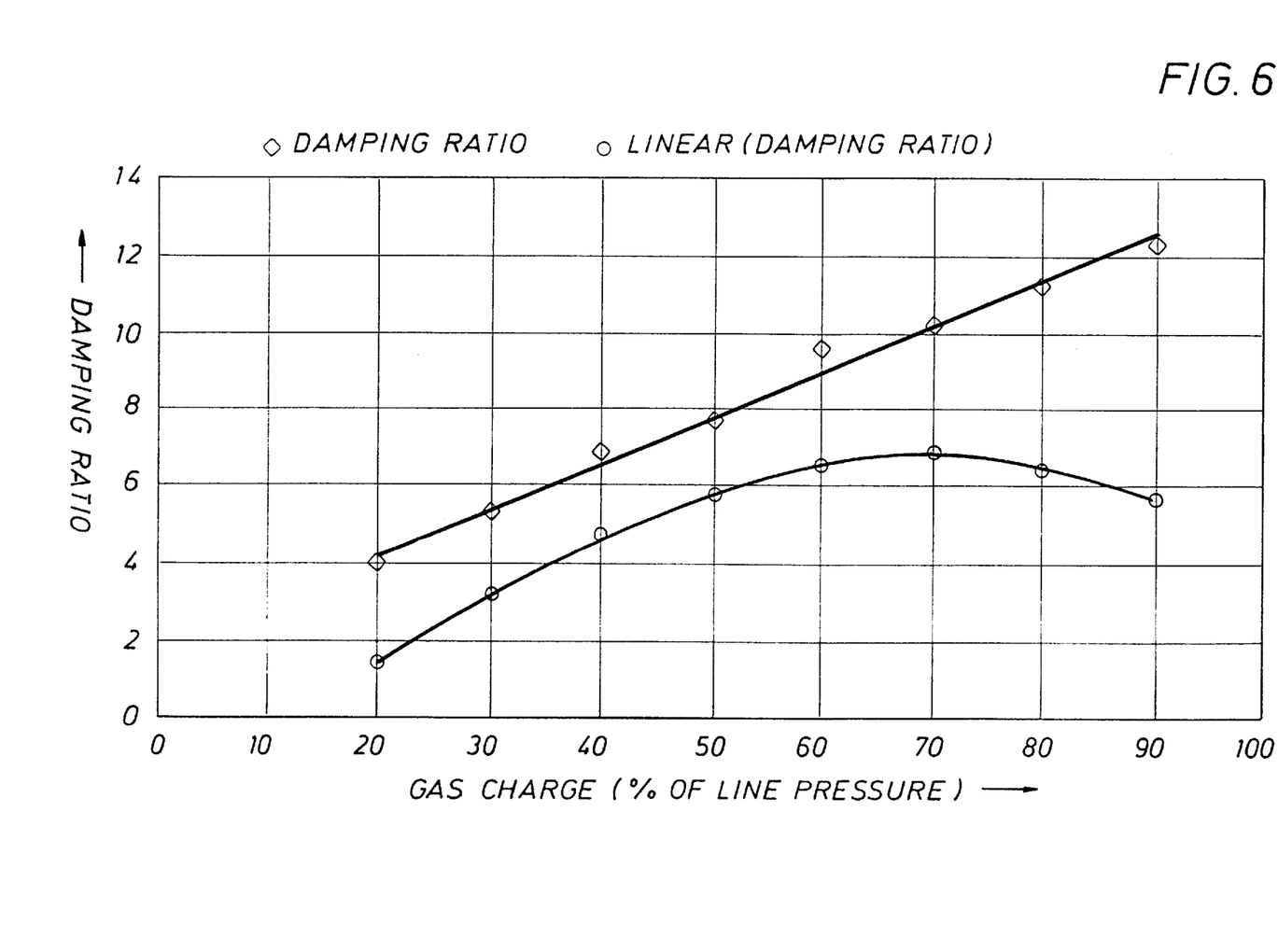
FIG. 6 is a graphical representation comparing the operating efficiency of a pulsation damper of the present invention with a prior art pulsation damper.

FIG. 6 of the drawings is a graphical representation of the operating efficiency of the pulsation damper of the present invention and a prior art pulsation damper illustrating the relationship between damping ratio and the gas charge in the gas chamber as a percentage of the pressure of the working fluid. The curves of FIG. 6 were developed using a triplex pump operating at a speed of 150 revolutions per minute and a working or "line pressure" of 1000 pounds per square inch (psi). The damping ratio, depicted on the vertical axis, is the ratio of the pulsation amplitude in the working fluid before and after damping. The horizontal axis depicts the pressure charge in the gas chamber as a percentage of the working line pressure.

The curve 70 in FIG. 6 was obtained using a damping assembly 10 of the present invention in which all the metal components were constructed of 316 stainless steel. The perforated disk 25 has a thickness of 0.015 in. and the perforations have a diameter of 0.033 in. The diaphragm 33 and O-ring 41 were constructed of Viton®, a flexible fluorocarbon material. The thin portion 36 of the diaphragm 33 was 0.017 in. thick and the thicker base 34 had a thickness of 0.033 in. The flat PTFE ring 45 had a thickness of 0.010 in. Dry nitrogen at pressures ranging between 200 psi and 900 psi was employed to charge the chamber 56. The outside diameter of the main body 50 was 3.25 in. and the axial length of the assembly, as measured centrally across the main body 50 and coupling 20, was 2.7 in. The total dimension laterally across the main body 50, including the charging valve 60, was 4.9 in. The prototype pulsation damping assembly operating with the design, materials of construction and dimensions given for the assembly 10 weighs 6 lbs. and is rated at a maximum operating pressure of 5000 psi and a maximum temperature of 400 degrees Fahrenheit.

The curve 71 in FIG. 6 was obtained using a prior art "tubular" pulsation absorber (suppressor) device manufactured by Wilkes-McLean, Ltd. The Wilkes-McLean suppressor, employing a design such as described in detail in U.S. Pat. No. 4,759,387, was operated with a dry nitrogen gas charge pressure ranging between 200 psi and a 900 psi. The prior art suppressor had a tubular diameter of 2.5 inches, a tubular length of 6.875 inches and a combined tubular diameter and charge valve height of 4.25 in. The device weighed approximately 6.5 lbs.

An important feature of the damping assembly 10 is that the damping ratio of the assembly continues to increase linearly as the gas charge in the gas chamber 56 approaches the operating pressure of the line containing the working fluid. This feature is readily apparent from the straight-line curve 70 in FIG. 6. As may be seen by reference to the curve 71, a conventional prior art dampening assembly exhibits a decreasing damping ratio in the upper operating ranges as the assembly gas charge approaches that of the line pressure. If desired, the damper assembly 10 of the present invention may be used to damp pressure pulses in a static fluid system by simply blocking the outlet port and applying the static working fluid to the inlet port 15. Such a system would have use, for example, in damping pressure fluctuations in a pressure gauge.

Figure 5:
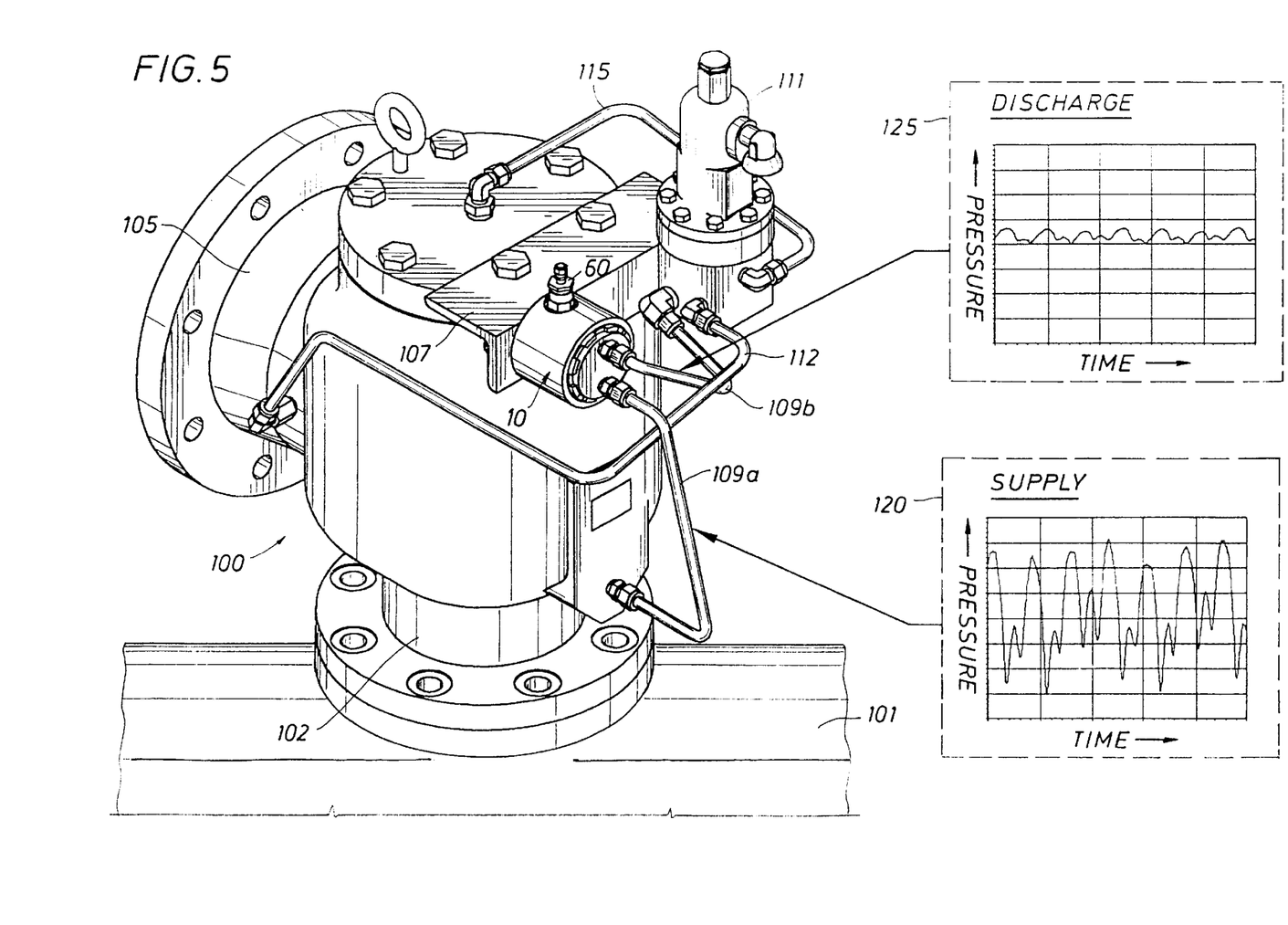
FIG. 5 is a perspective view of a pilot operated pressure valve equipped with the pulsation damper of the present invention.

FIG. 5 of the drawings illustrates the pressure damper 10 of the present invention installed in the pilot operating system of a pilot operated, pressure relief valve indicated generally at 100. A pressurized working fluid in a regulated or monitored system 101 is provided to an inlet 102 of the valve 100. Excess pressure in the system 101 is vented through the valve 100 to an outlet 105.

The damper assembly 10 is secured to the valve 100 with an accessory bracket 107. The damper assembly 10 is plumbed between pilot sense line sections 109a and 109b so that pressure at the inlet 102 of the valve 100 communicates through the damper assembly 10 to the sensing input of a pilot control 111. A discharge pressure line 112 discharges fluid flowing through the pilot control 111 into the outlet 105. A pilot control line 115 extends from the pilot 111 to the relief control 100 to regulate the opening and closing of the valve 100. When opened under the direction of the pilot control 111, the valve 100 permits fluid from the system 101 to flow through the valve 100 and out through the outlet 105.

A Pressure verses Time chart 120 in FIG. 5 illustrates pressure fluctuations in the working fluid contained within the system 101. A similar chart 125 in FIG. 5 illustrates the damped fluctuations in the system working fluid after the pulsation damper 10 has processed the fluid. As may be noted by comparing the difference in the amplitudes of the pressure pulsations in the charts 120 and 125, the pulsations in the pressure fluid in the sensing line 109b have been substantially reduced. The reduction in the pulsation amplitudes permits the operating pressure of the fluid in the system 101 to be raised closer to the opening or set point of the pilot operated, pressure relief valve 100.

Figure 4:
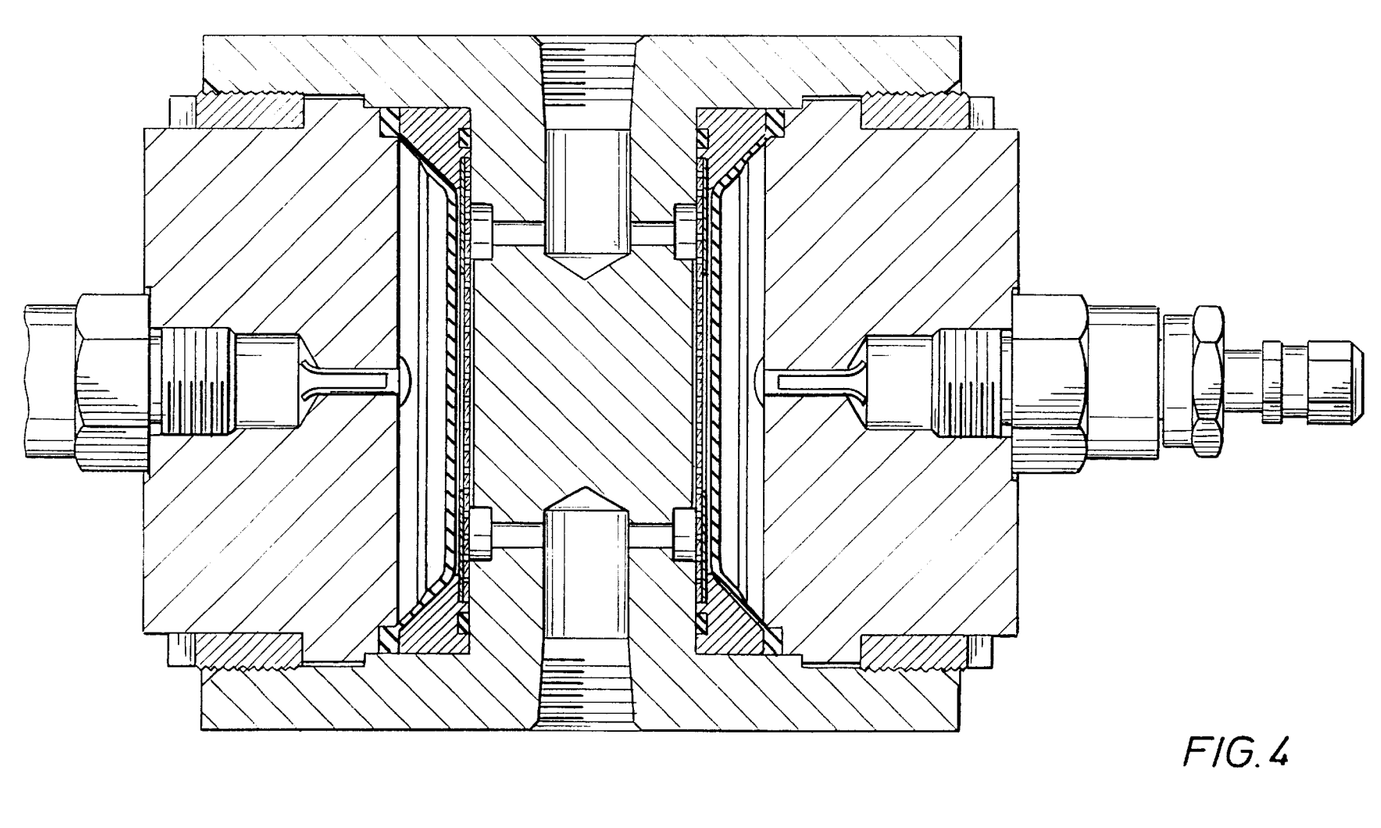
FIG. 4 is an elevation view, partially in section, illustrating a modified form of the pulsation damper of the present invention.

A modified pulsation damper of the present invention is indicated generally at 210 in FIG. 4 of the drawings. The system 210 permits the range of high damping of the working fluid to be efficiently extended over wider pressure ratios. The pulsation damper 210 includes two symmetrically arranged pulsation damper sections 211 and 212, each similar in operation to the pulsation damper 10. The sections 211 and 212 are combined to effectively increase the damping effect of pulsations in a working fluid flowing through the damper. An important feature of the system 210 is that each of its dual gas charge chambers may be charged to different gas charge pressures to accommodate and more efficiently dampen pressure pulsations over larger pressure ranges of fluids as compared with the system 10.

The pulsation dampener section 211, which is identical in construction to its symmetrical section 212, is identified with reference characters that are higher by 200 than corresponding components in the pulsation damper 10. Because of the similarity in construction and operation of the two damper sections 211 and 212, only the section 211 will be described in detail. It will be understood that components of the damper section 212 operate in a manner symmetrically consistent with their corresponding components in the damper section 211.

Working fluid to be damped by the system 200 enters an inlet port 215 formed in one end of a main body 250. The working fluid flows through the dampener 200 and exits through an outlet port 217 formed in the opposite side of the main body 250. A steel coupling 220, held in position on the main body 250 with a steel retaining ring 251, forms a gas charge chamber 256a in the damper section 211. A symmetrically corresponding gas chamber 256b is formed in the adjoining pulsation damper section 212.

Gas is supplied to the chamber 256a through a gas charge valve 260. A spring loaded poppet 261 covers the access opening from the charging valve to the chamber 256. The poppet 261 cooperates with a flat retaining wall 255 to limit displacement of a diaphragm 233. The diaphragm 233 isolates the gas chamber 256a from a space 231 that communicates with the working fluid. A perforated disk 225 in the space 231 communicates with an annular groove 223 machined into a flat backing surface 222 formed on the main body 250. The backing surface 222 limits displacement of the diaphragm 233 when the gas charge greatly exceeds the pressure of the fluid at the inlet 215. As with the assembly 10, compression of the gas charged chamber 256a by the working fluid in the assembly 210 causes fluid entering the port 215 to flow back and forth through perforations in the perforated disk 225 to dampen pressure pulsations in the fluid.

In operation, the chambers 256a and 256b are each charged to a different pressure. The chamber charge with the lower pressure dampens pulsations of lower average pressure efficiently whereas the damper with a higher charge dampens the pulsations of higher average pressure more efficiently. The dual chamber design also provides a working back up that continues pulsation damping even if one of the chambers should fail. It will be appreciated that the pulsation damping effect provided by the charged chambers 256a and 256b can be provided by equivalent devices such as spring loaded piston-cylinder force absorbing devices or other equivalent devices that absorb the energy of the pressure pulsations.

While preferred embodiments of the pulsation damper of the present invention have been described in detail herein, it will be appreciated that other forms of the invention may be made without departing from the spirit and scope of the invention, as set forth in the following claims.

What is claimed is:

1. An apparatus for damping pressure pulsations in a working fluid, comprising:
   a housing,
   a first chamber in said housing for receiving a working fluid to be damped,
   a second chamber in said housing for receiving a pressurized charging fluid,
   a flexible diaphragm disposed between said first and second chambers for forming a pressure separation between said first and second chambers, said diaphragm being movable within said first and second chambers in response to pressure differentials existing between said first and second chambers,
   a planar backing surface in said first chamber for limiting the movement of said flexible diaphragm away from said second chamber, and
   a perforated body disposed in said first chamber of said housing between said backing surface and said flexible diaphragm, said perforated body having multiple perforations whereby said working fluid flows through perforations in said body as said diaphragm is moved within said first and second chambers.

2. An apparatus as defined in claim 1 wherein said perforated body has a planar surface for engagement with said flexible diaphragm.

3. An apparatus as defined in claim 2 wherein said planar backing surface is spaced from said perforated body a distance that prevents said perforated body from bending in a direction toward said planar backing surface an amount that is beyond a yielding stress of materials of said perforated body.

4. An apparatus as defined in claim 3 wherein said first chamber includes an inlet and an outlet for respectively conducting said working fluid into and out of said first chamber.

5. An apparatus as defined in claim 4 further comprising flow passages recessed in said planar backing surface and extending between said inlet and said outlet for communicating working fluid between said inlet and said outlet.

6. An apparatus as defined in claim 2 wherein said flexible diaphragm is provided with a flat base for engagement with said planar surface of said perforated body.

7. An apparatus for damping pressure pulsations in a working fluid, comprising:
   a housing;
   a first chamber in said housing for receiving a working fluid to be damped,
   a second chamber in said housing for receiving a pressurized charging fluid,
   a flexible diaphragm disposed between said first and second chambers for forming a pressure separation between said first and second chambers, said diaphragm being movable within said first and second chambers in response to pressure differentials existing between said first and second chambers,
   a planar backing surface in said first chamber for limiting the movement of said flexible diaphragm away from said second chamber,
   a perforated body disposed in said first chamber of said housing beteween said backing surface and said flexible diaphragm, said perforated body having multiple perforations whereby said working fluid flows through perforations in said body as said diaphragm is moved within said first and second chambers, and
   a second apparatus for simultaneously damping pressure pulsations in said working fluid, said second apparatus having a pressurizable chamber for receiving a pressurized fluid at a pressure different than the pressure of the fluid in said second chamber whereby pulsations of higher average values in said working fluid may be damped over an increased range of damping ratios.

8. A pulsation damper for damping pressure pulsations in a working fluid, comprising:
   a first assembly for reacting to pressure pulsations in said working fluid,
   a second assembly for simultaneously reacting with said first assembly to pressure pulsations in said working fluid,
   a first preset force in said first assembly for resisting pressure pulsations in said working fluid, and
   a second preset force in said second assembly for resisting pressure pulsations in said working fluid, said first preset force being greater than said second preset force.

9. A pulsation damper as defined in claim 8 wherein said first and second assemblies comprise first and second gas charged chambers having first and second gas charge pressures, respectively, for providing said first and second preset forces.

10. A pulsation damper as defined in claim 9 further comprising first and second flexible diaphragms separating said working fluid from said first and second gas charged chambers, respectively, and movable in response to pressure pulsations in said working fluid.

11. A pulsation damper as defined in claim 10 further comprising first and second perforated disks disposed in said working fluid whereby said working fluid flows through said perforated disks as said first and second diaphragms are moved.

12. A pulsation damper as defined in claim 11 wherein said first and second perforated disks are closely backed by first and second planar retaining surfaces whereby said retaining services limit movement of said first and second disks, respectively.

13. A pulsation damper as defined in claim 12 wherein said first and second diaphragms have first and second flat bottoms, respectively, engageable with said first and second perforated disks, respectively.

14. A pulsation damper as defined in claim 13 wherein said first and second diaphragms have first and second annular walls, respectively, connecting said first and second diaphragms to said first and second assemblies, respectively, and wherein said first and second annular walls connect with said first and second flat bottoms, respectively to form said first and second gas charged chambers, respectively.

15. A pulsation damper as defined in claim 14 wherein said first and second flat bottoms are thicker than said first and second annular walls.

16. An apparatus for damping pulsations in a working fluid, comprising:

a housing extending along a central axis, a first chamber in said housing extending along said central axis for receiving a working fluid, a second chamber in said housing extending along said central axis for receiving a pressurized charging fluid, a cup-shaped, flexible diaphragm extending along said central axis between said first and second chambers for forming a pressure separation between said first and second chambers, said diaphragm being movable between said first and second chambers in response to a difference in pressure existing between said first and second chambers, said diaphragm further having a base connecting with an annular wall that expands axially an axial wall height and an annular mounting lip at an end of said annular wall opposite said base, a backing surface in said first chamber and a retaining wall in said second chamber for limiting the movement of said flexible diaphragm, and a perforated body disposed in said first chamber of said housing between said backing surface and said flexible diaphragm, said perforated body having multiple perforations whereby said working fluid flows through perforations in said body as said diaphragm is moved within said first and second chambers.

17. An apparatus as defined in claim 16 wherein said perforated body includes a flat planar surface facing said flexible diaphragm.

18. An apparatus as defined in claim 17 wherein said backing surface is spaced from said perforated body by a distance sufficient to prevent bending of said perforated body beyond its yielding bending radius.

19. An apparatus as defined in claim 17 wherein said annular wall of said diaphragm is thinner then said base of said diaphragm.

20. An apparatus for damping pulsations in a working fluid, comprising:

a housing extending along a central axis, a first chamber in said housing extending along said central axis for receiving a working fluid, a second chamber in said housing extending along said central axis for receiving a pressurized charging fluid, a cup-shaped, flexible diaphragm extending along aid central axis between said first and second chambers for forming a pressure separation between said first and second chambers, said diaphragm being movable between said first and second chambers in response to a difference in pressure exisiting between said first and second chambers, as said diaphragm further having a base connecting with an annular wall that expands axially an axial wall height and an annular mounting lip at an end of said annular wall opposite said base, a backing surface in said first chamber and a retaining wall in said second chamber for limiting the movement of said flexible diaphragm, a perforated body disposed in said first chamber of said housing between said backing surface and said flexible diaphragm, said perforated body having multiple perforations whereby said working fluid flows through perforations in said body as said diaphragm is moved within said first and second chambers, and a second pulsation damper for simultaneously damping pressure pulsations in said working fluid, said second pulsation damper having a pressurized chamber for receiving a pressurized fluid at a pressure different than the pressure of the fluid in said second chamber.

21. An apparatus for damping pulsations in a working fluid, comprising:

a housing extending along a central axis, a first chamber in said housing extending along said central axis for receiving a working fluid to be damped, a second chamber in said housing extending along said central axis for receiving a pressurized charging fluid, a cup-shaped, flexible diaphragm extending along said central axis between said first and second chambers for forming a pressure separation between said first and second chambers, said diaphragm being movable between said first and second chambers in response to a difference in pressure existing between said first and second chambers, said diaphragm further having a base and an annular wall extending axially an axial wall height and an annular mounting lip at an end of said annular wall, said diaphragm being secured to said housing at said mounting lip and said annular wall having a thickness less than the thickness of said a base, a backing surface in said first chamber and a retaining wall in said second chamber for limiting the movement of said flexible diaphragm along said central axis, and a perforated body disposed in said first chamber of said housing between said backing surface and said flexible diaphragm, said perforated body having multiple perforations whereby said working fluid flows through perforations in said body as said diaphragm is moved within said first and second chambers.

22. An apparatus for damping pulsations as defined in claim 21 wherein said base of said flexible diaphragm is planar and said perforated body includes a planar perforated surface for engagement with said base of said flexible diaphragm.

23. An apparatus for damping pulsations as defined in claim 22 wherein said backing surface comprises a planar surface closely spaced away from said perforated body at a distance sufficient to prevent permanent bending of said perforated body when said perforated body is moved toward said backing surface.

24. An apparatus for damping pulsations as defined in claim 21, wherein said diaphragm is secured at said mounting lip adjacent one or the other of said backing surface and said retaining wall whereby axial movement of said diaphragm is limited to a distance equal to said axial wall height.

25. A method for damping pressure pulsations in a working fluid, comprising:

applying a working fluid to a first pulsation damper having a first response to pressure pulsations in said working fluid, and simultaneously applying said working fluid applied to said first pulsation damper to a second pulsation damper having a second response to pressure pulsations in said working fluid, whereby high damping ratios are obtained for a wider range of pressure ratios as compared with damping ratios obtained using a single pulsation damper.

* * * * *

UNITED STATES PATENT AND TRADEMARK OFFICE
CERTIFICATE OF CORRECTION

| | | |
|---|---|---|
| PATENT NO. | : 6,478,052 B1 | Page 1 of 1 |
| APPLICATION NO. | : 09/915006 | |
| DATED | : November 12, 2002 | |
| INVENTOR(S) | : Conley et al. | |

It is certified that error appears in the above-identified patent and that said Letters Patent is hereby corrected as shown below:

Drawings, Sheet 4 of 6
Please replace the drawing with the following drawing with legend numbers.

Signed and Sealed this

Sixth Day of November, 2007

JON W. DUDAS
*Director of the United States Patent and Trademark Office*